No. 751,921. PATENTED FEB. 9, 1904.
J. KAHN.
COMPOSITE BUILDING CONSTRUCTION.
APPLICATION FILED AUG. 14, 1903.
NO MODEL. 2 SHEETS—SHEET 1.
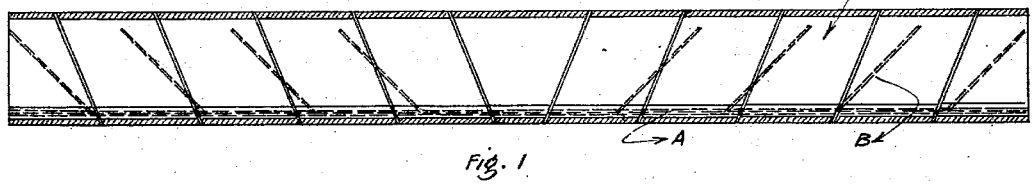
Fig. 1
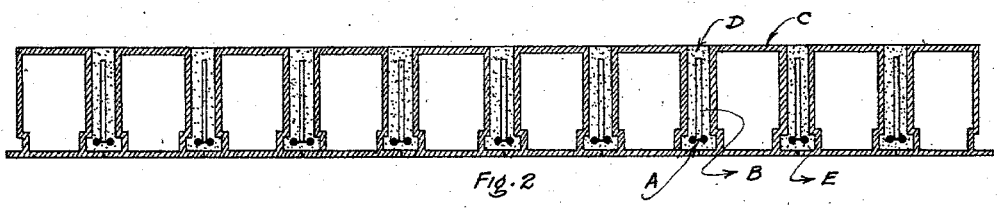
Fig. 2
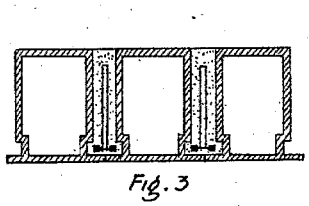
Fig. 3
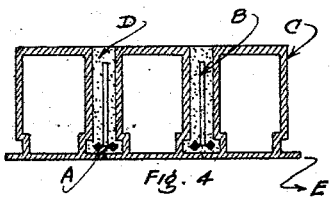
Fig. 4
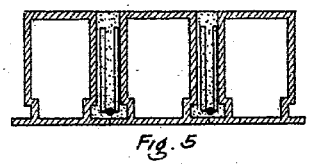
Fig. 5
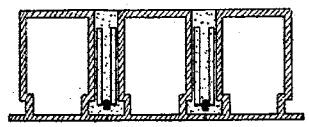
Fig. 6
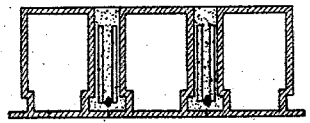
Fig. 7
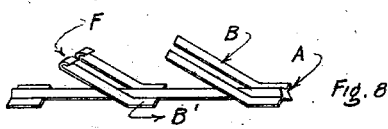
Fig. 8
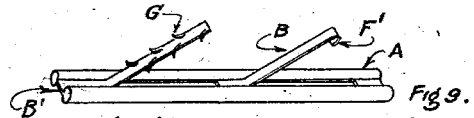
Fig. 9
Fig. 10
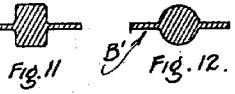
Fig. 11   Fig. 12
Fig. 13   Fig. 14   Fig. 15
WITNESSES.
Moritz Kahn
Chan. A. Bennett
INVENTOR.
Julius Kahn
By David N. Harper
Attorney No. 751,921. PATENTED FEB. 9, 1904.
J. KAHN.
COMPOSITE BUILDING CONSTRUCTION.
APPLICATION FILED AUG. 14, 1903.
NO MODEL. 2 SHEETS—SHEET 2.
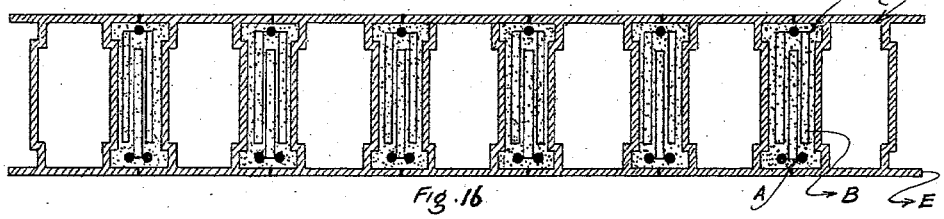
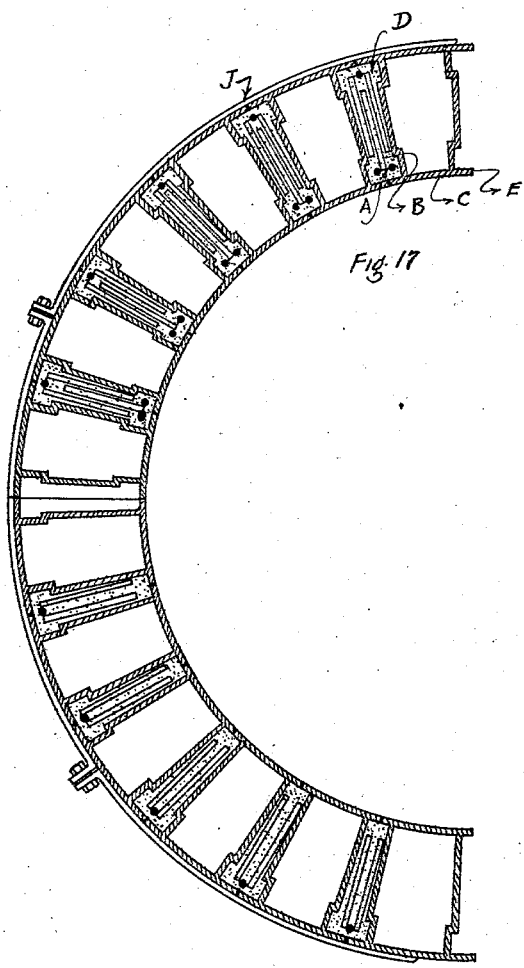
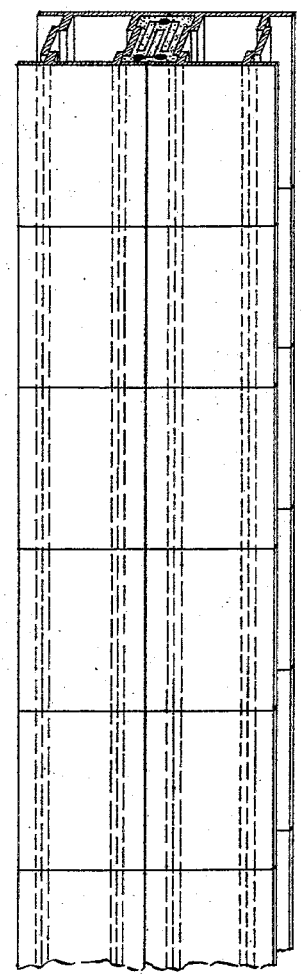
WITNESSES.
INVENTOR.
Julius Kahn
By David H. Harper
Attorney No. 751,921. Patented February 9, 1904.

UNITED STATES PATENT OFFICE.

JULIUS KAHN, OF DETROIT, MICHIGAN.

COMPOSITE BUILDING CONSTRUCTION.

SPECIFICATION forming part of Letters Patent No. 751,921, dated February 9, 1904.

Application filed August 14, 1903. Serial No. 169,550. (No model.)

*To all whom it may concern:*

Be it known that I, JULIUS KAHN, a citizen of the United States, residing at Detroit, in the county of Wayne and State of Michigan, have invented certain new and useful Improvements in Composite Building Constructions, of which the following is a specification.

This invention relates to composite building constructions; and it consists of a combination of one or more metallic members with concrete or similar substance and a burned clay product, such as terra-cotta, brick, porous tile and the like. Its primary object is to obtain the greatest functional utility by a novel construction and arrangement of the different elements which will produce the maximum of strength and carrying power with a minimum of dead weight.

It is the further object of my invention to obtain an absolutely fireproof construction, and also to facilitate the erection of the same by employing the simplest method of centering. The terra-cotta or similar material may be so arranged with respect to the whole that it forms a mold to readily receive the remaining elements of the construction, the concrete being supplied in a plastic form around the metallic member. The metal reinforcement consists of a main longitudinally-disposed portion having rigidly attached thereto at intervals throughout its length one or more laterally-extending arms, which are firmly embedded in the concrete or other cementitious substance. This metallic member forms a part-truss, the remaining elements of which are supplied by the concrete body material. This method of forming a completed truss I have already embodied in two applications, Serial Nos. 134,804 and 155,677, respectively; and the purpose of the present invention is to apply to floor, wall, and other construction the advantageous features of the composite truss described in the above-mentioned applications.

In the accompanying drawings, Figure 1 is a side elevation showing the hollow terra-cotta blocks and the metallic member in outline. Fig. 2 is a transverse end section of a floor of my construction, showing a union of the blocks, metallic members, and concrete. Figs. 3, 4, 5, 6, and 7 are similar views showing different modifications in the metallic member employed. Figs. 8 and 9 are perspective views of sections of metallic part-truss members, showing the longitudinal portions and the laterally-extending arms in different modifications. Figs. 10, 11, 12, 13, 14, and 15 are end views of modifications of metallic members. Fig. 16 is a transverse section of a retaining-wall. Fig. 17 is a similar section of a circular wall construction. Fig. 18 represents a side view of a wall constructed in accordance with my invention.

In the drawings similar letters refer to corresponding parts.

A represents the main portion of the metallic member, to which are attached at points intermediate its ends the laterally-extending arms B. As shown in Fig. 8, these arms are struck up from a portion of a web running along two opposite sides of the main portion A. They are preferably inclined at an angle to the main member outward in opposite directions from the middle line of said main portion, as indicated in Fig. 1, to correspond to the diagonals of a truss. In certain construction, however, these members may be all inclined in the same direction and be either oblique or perpendicular to the main portion.

As shown in Fig. 8, the arms B are struck up from the web running along two opposite sides of the main portion A. The part of the web left attached to the central portion is designated by B'.

A modification of the metallic member is shown in Fig. 9, in which the arms are struck up from a web lying between the longitudinal bars A. If desired, these arms may be provided with the barbs G for firmer contact with the body material. F' represents another modification of the arms B. Still other modifications of the metallic member may be used, different shapes of both the main portion and the arms employed, and the number and inclination of the arms varied as desired. In some cases I may prefer to have the arms struck up at right angles, or nearly so, to the main portion, in which form I desire to cover my invention, as well as the other forms described, adhering, however, to the form of having the said arms rigidly attached to the main portion A. The blocks C are formed hollow to reduce the weight of the floors and may be provided with the flanges E, which form a continuous fireproof ceiling when the blocks are set in position.

The amount of metal and of the cement D, compared to the extent of the blocks, is a very small proportion, due to the advantageous construction and arrangement of the metal and the cementitious material surrounding it.

The wall constructions shown in Figs. 16, 17, and 18 embody the common features already described. The flanges E on opposite faces of the blocks C make a continuous wall on both sides. In circular construction for elevators and the like horizontal supports J may be used at certain intervals.

I am aware that floors have been constructed of hollow tiles and supported by I-beams, girders, expanded metal, and other means and united by pouring plastic cement between the tiles, and therefore do not claim, broadly, hollow-tile floors.

The essential characteristic of my invention is the combination of the metal part-truss united with the hollow tiles by means of the cementitious body material in such a manner as to produce a self-sustaining floor of great supporting power. Another novel and advantageous feature of my combination is the mold or centering formed by the projecting flanges upon one or more sides of the tiles, so that when they are placed in position the form for the metal reinforcement and plastic concrete is obtained without the use of the usual tight board centering. In the floor construction shown in Figs. 1 to 7 these flanges are upon the lower surface only, while in the wall construction of Figs. 16 to 18 the flanges are upon two sides of the tile and form a complete mold about the vertically-placed metal part-trusses.

For both floor and wall, if desired, the tiles may fit closely to the metal reinforcement and only enough of the liquid cement or concrete be used to adhere the two, and thus support the wall or floor.

The metal part-trusses shown in Figs. 8 and 9 are improvements over the reinforcements described and claimed by me in the two applications hereinbefore referred to. They are constructed to be especially complementary of each other, so that when oppositely disposed the single row of arms of the one fits between the double rows of the other; also, used singly they are improvements over those heretofore claimed, as the longitudinal portion can be of sufficient cross-section to obtain the desired amount of strength, while the web portions contain a less amount of metal and in addition are more easily struck up laterally to the main bar.

It will be observed that the common features running through all of my constructions is one or more part-trusses consisting of a main portion and laterally-extending arms rigidly attached thereto, forming with the cementitious body material embedding the arms a complete truss of great sustaining power.

I do not restrict myself to the particular constructions shown and described; but

I claim as my invention and desire to secure by Letters Patent as follows:

1. In a composite building construction, the combination with one or more metallic part-trusses consisting of a main portion and rigidly attached, laterally-extending arms, of a cementitious body material embedding said part-truss, of a plurality of blocks of terra-cotta or similar material supported and retained by the metallic member and the body material surrounding it, substantially as described.

2. In a composite building construction, the combination with one or more metallic part-trusses consisting of a main portion having rigidly secured thereto one or more laterally-extending arms, said part-trusses embedded in a cementitious body material forming a trussed beam, of a plurality of blocks of terra-cotta or similar material supported and retained by the trussed beams, of projecting flanges upon one face of the blocks to form a continuous fireproof ceiling, substantially as described.

3. In a composite building construction, the combination with metallic part-trusses longitudinally disposed in parallel series, of blocks of terra-cotta or similar material placed between the metallic part-trusses, of flanges upon the lower surfaces of said blocks to make a continuous fireproof ceiling and to constitute a form or mold around the metallic members, of a cementitious material placed around the metallic members and against the adjacent walls of the blocks which are retained thereby, substantially as described.

4. A metallic reinforcing member consisting of a main longitudinal portion, and laterally-extending arms, formed by striking up portions of the web running along the two opposite sides of the main bar, substantially as described.

5. A metallic reinforcement consisting of a main longitudinal portion, having pairs of laterally-extending arms rigidly attached to the main portion at points intermediate its ends, substantially as described.

6. In composite building construction, blocks of terra-cotta or similar material, said blocks having flanges extending outward from the two opposite faces to form continuous fireproof walls, of metallic reinforcing members consisting of a main portion and laterally-extending arms rigidly attached thereto placed in the space included between the blocks and the flanges thereof, of concrete or similar substance uniting the blocks and the metallic members, substantially as described.

7. In a composite building construction, metallic reinforcing members vertically disposed in a circular position, said members consisting of a main portion and laterally-extending arms, of a plurality of blocks of terra-cotta or similar material having flanges projecting from two opposite faces and forming continuous fireproof walls when the blocks are placed adjacent, said blocks placed between the metallic reinforcing members; of a cementitious material surrounding the metallic members and holding the blocks in position, of horizontal supporting members placed around the circular retaining-wall, substantially as described.

8. A metallic reinforcement for hollow tile and floor construction consisting of complementary metal part-trusses oppositely disposed, one of which has a single row of laterally-extending arms placed between a double row of arms of the other part-truss, substantially as described.

In testimony whereof I have signed my name to this specification in the presence of two subscribing witnesses.

JULIUS KAHN.

Witnesses:
MORITZ KAHN,
CLARE A. BENNETT.